(12) United States Patent
Richter

(10) Patent No.: US 6,764,639 B1
(45) Date of Patent: *Jul. 20, 2004

(54) DRUM-LIKE CONTAINER OUT OF PLASTIC AND PROCESS AND DEVICE FOR ITS PRODUCTION

(75) Inventor: Günter Richter, Altenkirchen (DE)

(73) Assignee: Greif Bros. Corporation, Delaware, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/230,903

(22) PCT Filed: Aug. 23, 1997

(86) PCT No.: PCT/DE97/01842

§ 371 (c)(1),
(2), (4) Date: Feb. 3, 1999

(87) PCT Pub. No.: WO98/08668

PCT Pub. Date: Mar. 5, 1998

(30) Foreign Application Priority Data

Aug. 31, 1996 (DE) .......................................... 196 35 334

(51) Int. Cl.[7] .......................... B29C 49/04; B29C 49/22
(52) U.S. Cl. ...................................... 264/515; 220/662
(58) Field of Search .............................. 220/62.22, 662, 220/663, 4.05, 675; 215/12.2, 265; 264/515, 512, 171.27; 425/130, 532

(56) References Cited

U.S. PATENT DOCUMENTS

| | | | | |
|---|---|---|---|---|
| 2,227,682 A | * | 1/1941 | Wade | 264/78 |
| 3,889,839 A | * | 6/1975 | Simon et al. | 220/675 |
| 4,213,536 A | * | 7/1980 | Hafner | 220/663 |
| 4,297,092 A | * | 10/1981 | Goron | 425/133.1 |
| 4,399,265 A | * | 8/1983 | Garware et al. | 528/308.2 |
| 4,802,833 A | * | 2/1989 | Shapler | 425/131.1 |
| 4,890,994 A | * | 1/1990 | Shapler et al. | 425/131.1 |
| 5,055,023 A | * | 10/1991 | Richter | 425/133.1 |
| 5,204,120 A | * | 4/1993 | Hirschberger | 425/132 |
| 5,221,540 A | * | 6/1993 | Hirschberger | 425/131.1 |
| 5,301,840 A | * | 4/1994 | Sun | 222/109 |
| 5,322,658 A | * | 6/1994 | Holoubek et al. | 264/150 |
| 5,464,107 A | | 11/1995 | Koeniger | |

FOREIGN PATENT DOCUMENTS

| | | |
|---|---|---|
| EP | 0321946 | 6/1989 |
| EP | 0491093 | 6/1992 |
| WO | 8802689 | 4/1988 |

* cited by examiner

*Primary Examiner*—Lee Young
*Assistant Examiner*—Joseph C. Merek
(74) *Attorney, Agent, or Firm*—Baker & Hostetler LLP

(57) ABSTRACT

This invention concerns a drum-like container made of a discontinuously extruded hose-like perform of thermoplastic in a blow molding process. The drum-like container has a wall consisting of an inner layer, an outer layer, and at least one intermediate layer. To make it possible to monitor the fill level of the fill material, the wall has a visual indicator strip of translucent plastic running in the axial direction.

2 Claims, 1 Drawing Sheet

DRUM-LIKE CONTAINER OUT OF PLASTIC AND PROCESS AND DEVICE FOR ITS PRODUCTION

BACKGROUND OF THE INVENTION

1. Field of the Invention

The invention pertains to a drum-like container produced by blow-molding from a discontinuously extruded tubular preform of thermoplastic material, with a wall consisting of an inner layer, an outer layer, and at least one middle layer.

2. Description of the Related Art

A process and a device for the production of a large-capacity hollow body, such as a drum, out of plastic with a multi-layer wall are known from European Patent Publication 0,326,584. The device consists of an annular piston, acting as a co-extrusion head, which can slide axially in a housing; this piston has a flow channel bore extending approximately in the radial direction for each layer of the wall and thus for each plastic melt; each of these bores opens out into a ring-shaped distributor. The ring-shaped distributor then leads to a common flow channel, into which the individual plastic melts flow one after the other. The flow channel located approximately in the center of the annular piston gradually expands to the cross section of a ring-shaped reservoir upon which the annular piston acts.

In the case of storage or transport containers such as drums with a multi-layer wall, the outer layer of the wall, and thus also the layer of the preform which is blow-molded to form the drum-like container, is colored in a special way to provide protection against UV rays, for example, or to give a certain visual appearance. At the same time, however, it is also desirable to have the ability to determine at any timed, without any special measuring devices, how much liquid is still in the drum-like container simply by looking at it from the outside.

A device for the discontinuous production of a tubular, multi-layer, co-extruded preform of thermoplastic material, out of which a drum-like container is formed by the blow-molding process, is known from DE-GM 91-07,812, in which a connecting channel is provided between the ring-shaped channel for the plastic melt of the inner layer, which consists of clear or transparent plastic, and the ring-shaped channel for the outer layer, which consists of a colored plastic composition. As a result of this connecting channel, a so-called "view strip" can be produced in the outer layer, which makes it possible to see how much liquid is left in the finished container. If the wall of the container has more than two layers, however, it is impossible by means of this device to produce a preform for a drum-like container which has a view strip to allow the determination of the amount of liquid left in the container.

SUMMARY OF THE INVENTION

The invention is therefore based on the task of creating a drum-like container which has walls consisting of at least three layers and which makes it possible to determine the degree to which the container is filled at any time.

To accomplish this task, it is proposed in accordance with the invention that the wall of a drum-like container of the general type described above has a view strip of translucent plastic extending in the axial direction.

By means of the view strip, it is possible for the amount of material present in a container designed in this way to be monitored or checked regularly.

BRIEF DESCRIPTION OF THE DRAWING

The invention is explained in greater detail below on the basis of an exemplary embodiment, which is illustrated in simplified form in a drawing.

DESCRIPTION OF THE PREFERRED EMBODIMENTS

Figure 1:
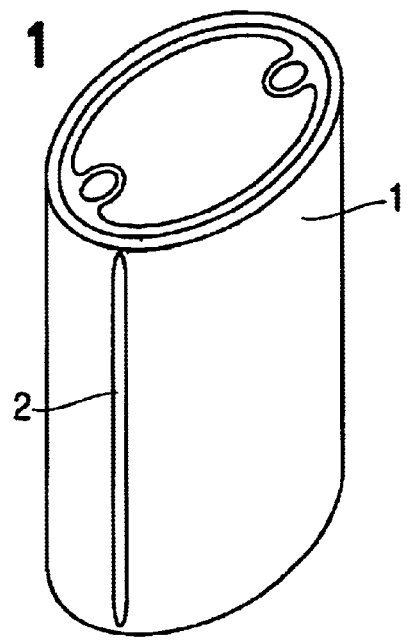
FIG. 1 shows a perspective view of a container according to the invention.
Figure 2:
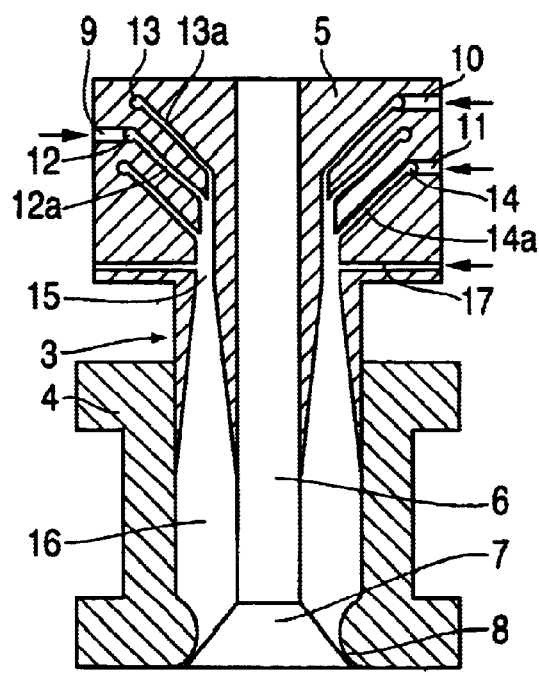
FIG. 2 shows a cross section through a device according to the invention for producing a container such as that shown in FIG. 1.

FIG. 1 of the drawing shows a drum-like container 1, which is produced from a tubular preform of thermoplastic material by blow-molding. The wall of the preform consist of at least three different layers, and a view strip 2 extending in the axial direction is incorporated into this wall. The tubular preform out of which drum-like container 1 is made is produced by means of a device with an annular piston reservoir 3 or ring-shaped retaining head as shown in FIG. 2 of the drawing. Annular piston reservoir 3 consists, first, of a reservoir jacket 4, which is connected in a manner known in itself (not shown) to a housing, known in itself. In the exemplary embodiment shown, stationary reservoir jacket 4 holds an axially movable annular piston 5, through which a mandrel 6 with a mushroom-shaped nozzle tip 7 can be moved in the axial direction. Between reservoir jacket 4 and mushroom-shaped nozzle tip 7 there is a nozzle gap 8, which can be opened and closed by the axial displacement of mandrel 6. For this movement, mandrel 6 is provided with a drive (not shown), designed as, for example, a piston-cylinder unit.

In the part extending outside reservoir jacket 4, annular piston 5 has three flow channel bores 9, 10, 11, to each of which an extruder for a different plastic melt is connected. Through flow channel bore 10, for example, a clear or transparent plastic melt is supplied, which forms the so-called inner layer of the tubular preform to be produced and thus the inner layer of container 1 ultimately obtained. Flow channel bore 9 is supplied with a plastic melt which consists of recycled plastic. It is advantageous for this recycled plastic to consist of the so-called slug material, which accumulates during the blow-molding of container 1. The plastic melt supplied through flow channel bore 9 forms the so-called middle layer of the preform and thus of ultimate container 1. This middle layer is opaque. Via flow channel bore 11, finally, a third plastic melt arrives in annular piston 5; this melt is colored and consists of a material resistant to UV radiation. This plastic layer forms the outside layer of the preform and thus the outside layer of ultimate blow-molded container 1.

Each of flow channel bores 9, 10, 11 leads first to an encircling, ring-shaped distributor 12, 13, 4, to each of which a slanting, ring-shaped channel 12a, 13a, 14a is connected. These ring-shaped channels 12a, 13a, 14a open out in succession into a common ring-shaped channel 15, which gradually expands to the width of a ring-shaped reservoir 16 in reservoir jacket 4. Because the individual plastic melts are supplied in succession to common ring-shaped channel 15 and because this channel expands gradually to the cross section of ring-shaped reservoir 16, it is ensured that the individual layers of the multi-layer plastic melt are not changed in their structure, but rather remain intact. This also applies to container 1, which is made from the tubular preform produced in annular piston reservoir 3.

In the exemplary embodiment shown in FIG. 2, another flow channel bore 17 is provided on the right side of annular piston 5; this bore is connected to an extruder, which supplies a translucent plastic melt to annular piston 5. If needed, this flow channel bore 17 can also be connected to the extruder which is connected to flow channel bore 9. It is necessary, however, to install upstream of flow channel bore 17 a device which can accurately control the pressure and flow rate of the translucent plastic melt being supplied.

Figure 3:
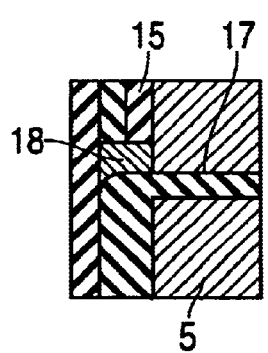
FIG. 3 shows an enlarged section of the device of FIG. 2 in the area where the view strip is formed.

The opening of flow channel bore 17 is a certain distance away from slanting ring-shaped channels 12a, 13a, 14a and is directed radially into the common ring-shaped channel 15. In the area where this flow channel bore 17 opens into the common channel, a flow-control element (FIG. 3), designed as a torpedo 18, is inserted into ring-shaped channel 15 to divide the outer layer and the middle layer of the multi-layer plastic melt and thus to allow the infeed of the translucent plastic melt. Torpedo 18 extends up as far as the plastic melt forming the inner layer of the preform, which is not colored. The translucent plastic melt supplied through flow channel bore 17 produces a transparent strip in the opaque plastic melts of the outer layer and middle layer; this strip later forms view strip 2 in blow-molded container 1. It is thus possible to see through this strip to check or monitor visually the degree to which the drum-like container 1 is filled; that is, there is no need for any special measuring device. It is advantageous, however, for the translucent plastic melt not to pass continuously through flow channel bore 17, but rather only just long enough to extend all the way along the area which later forms the lateral surface of container 1. It is known, after all, that there is no need for a view strip 2 in either the bottom or the top of container 1.

In the case that the plastic melt forming the inner layer of the wall of container 1 or of the tubular preform is opaque, the translucent plastic melt supplied through flow channel bore 17 must extend all the way to the opposite wall of common ring-shaped channel 15. This means that torpedo 18 must be long enough to interrupt all three layers of the multi-layer plastic melt and allow the infeed of the translucent plastic melt for view strip 2.

What is claimed is:

1. A process for producing a drum-shaped container of plastic having a wall composed of an uninterrupted inner layer of translucent plastic, an outer layer and at least one middle layer between the inner and outer layers, wherein of the outer layer and the at least one middle layer at least the outer layer is of a non-translucent plastic, the process comprising bringing at least two different ring-shaped plastic melts together in succession and centering the melts within a ring-shaped reservoir shaped so as to expand in a funnel-like manner, ejecting the melts as a multi-layer plastic melt for a discontinuous formation of a tubular parison, subsequently blow-molding the parison to form the container, further comprising after the ring-shaped plastic melts have been brought together but prior to entering the funnel-shaped area of the ring-shaped reservoir, feeding a narrow strip of a translucent plastic melt into only the outer layer and the middle layer of the multi-layer plastic melt.

2. The process according to claim 1, comprising feeding the translucent plastic melt at least over most of the time during which the ring-shaped reservoir is being filled.

* * * * *